N. W. Graves,
Making Fellies.
No. 62,408.    Patented Feb. 26, 1867.
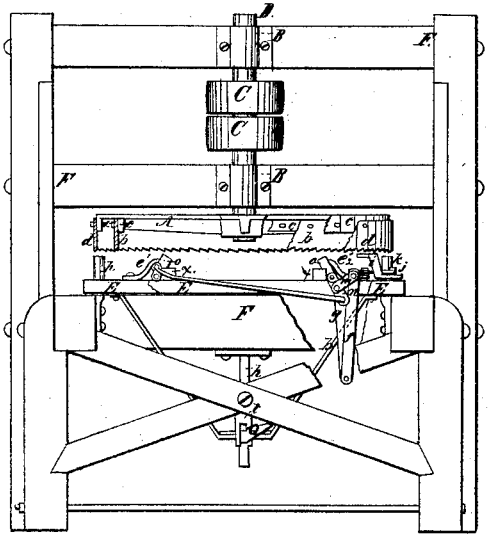
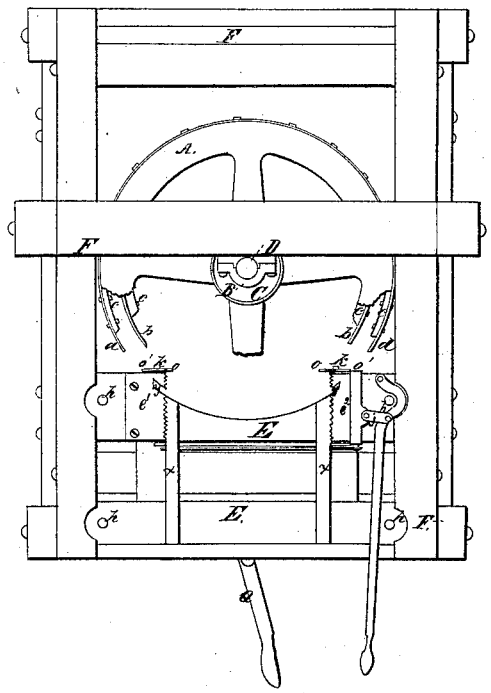
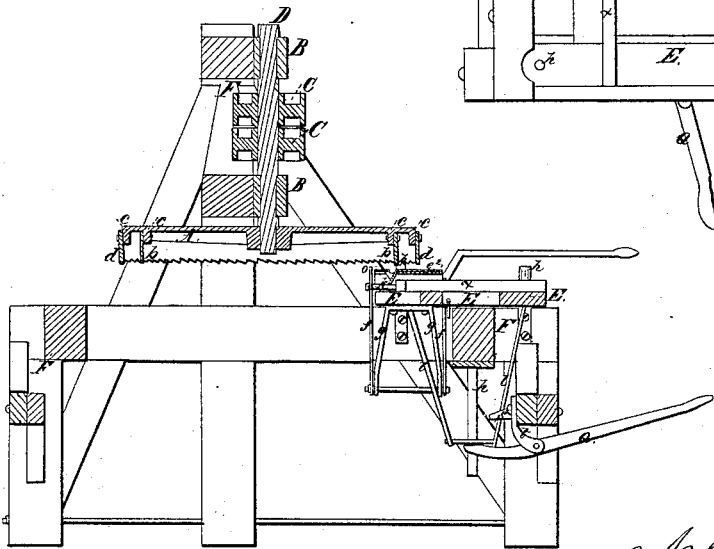
Witnesses:
Cyrus F. Miller
John M. Buell
Inventor:
Noble W. Graves

United States Patent Office.

NOBLE W. GRAVES, OF WINNEBAGO, ILLINOIS.

Letters Patent No. 62,408, dated February 26, 1867.

---

IMPROVEMENT IN MACHINES FOR SAWING WAGON FELLOES.

---

*The Schedule referred to in these Letters Patent and making part of the same.*

---

TO ALL WHOM IT MAY CONCERN:

Be it known that I, NOBLE W. GRAVES, of Winnebago, in the county of Winnebago, in the State of Illinois, have invented a new and useful Improvement in Machines for Cutting Wagon Felloes; and I do hereby declare that the following is a full, clear, and exact description of the construction and operation of the same, reference being had to the annexed drawings, making a part of this specification, in which—

Figure 1 is a front elevation, with some parts of the frame and table removed.

Figure 2 is a top view.

Figure 3 is a longitudinal sectional elevation through the centre.

The same letters in the several drawings refer to the same parts.

To enable others skilled in the art to make and use my invention, I will proceed to describe its construction and operation.

A represents a wheel, constructed with hub, arms, and rim. There are flanges, $c\ c$, upon both the outer and inner edges of the rim upon the under side. The diameters of this wheel and of the wheel for which the felloes are to be cut is the same. To the outer side of these flanges saws or other cutting devices are fastened, so that the distance between the outer and inner saw shall be the same as the depth of the felloe to be cut. Wheel A is made fast, or hung on the lower end of upright shaft D, having its bearings above in boxes B B. C C are pulleys upon shaft D, one loose, the other fast. Motion is given to wheel A by means of a belt passing around these pulleys. Portions of wheel A and of the saws are cut away, showing more fully the construction of the wheel and the saws attached, $a\ a$ representing the outside and $b\ b$ the inside saw, and $c\ c$ the flanges. Other cutting tools may be attached to these flanges, and used in place of saws. E E is the saw table, with its several parts attached. This table is immediately in front of and below wheel A, and its top is parallel to it. This table rests upon the main frame of the machine, and is moved up and down perpendicularly upon the fire bearings or slides $h\ h\ h$, &c., by means of foot-lever Q. The part of the edge of the table next to the saws, and where the felloe is cut out, is constructed on a curve or circle corresponding with that of the outer saw. This form of the table allows the felloe, when cut and released from the dogs, to fall at once out of the way. $e1$ and $e2$ are saw-toothed dogs, $e1$ being bolted fast to the table and $e2$ made fast to stirrup $f$, which have their bearings in stanchion $g$. These dogs are slotted, as seen at $y$, so that when the table is raised by means of lever Q, the outer saw can do its work without coming in contact with the dogs, and at the same time enable the dogs to hold both the main bolt and the felloe while being cut, and until it is released by the movement of lever $i$, when it drops out of the way. It will be observed that all of the working parts of this machine are attached to the saw table, and move with it, except saw-wheel A and its attachments and foot-lever Q. The arrangement of these several parts I will now explain. Stanchion $g$ is made fast to the under side of the table. Dog $e2$, while it is made fast to stirrup $f$, is also connected to lever $i$ by pitman $j$. Under the dogs are the shafts $k\ k$, on the ends of which are the stops or gauge-pieces $o\ o$. Stirrup $f$ is connected to crank $n$ by pitman $m$, and cranks $n$ and $p$ are connected by pitman $z$. Now, by taking hold of lever $i$ with the right hand, and bringing it inwards or towards you, dog $e2$ will be moved in the direction of dog $e1$. At the same time, by means of the connections already explained, stops or gauges $o\ o$ will be moved to the positions of the dotted lines $o'\ o'$, so that when the table rises they will come up between the saws and out of their way. Bearings, $h\ h\ h$, &c, may be fitted to boxes set in the saw table. $x\ x$ are ways upon the top of the table for the ends of the bolts or planks to rest upon.

To operate this machine, let there be bolts or planks provided of the proper length and thickness. Place a bolt or plank with its ends upon the ways $x\ x$, and with the left hand push it forward against the stops or gauges $o\ o$. Bring lever $i$ toward you with the right hand, clamping the bolt fast between the dogs, and hold it firmly. Place your foot upon lever Q, and press it down gradually. This will force the table up, bring the bolt in contact with the saws upon wheel A, put in motion as before described. A felloe will be immediately cut out. Then remove the pressure from lever Q, and let the table descend. Now throw back lever $i$, releasing the dogs from their hold. The felloe cut drops, and the stops or gauges return to their places. Push forward the bolt against the stops; bring up lever $i$, as before, clamping the bolt; press down foot-lever Q, &c., repeating the operation each time a felloe is cut. $l\ l$, &c., are braces, which serve in connection with bearings $h\ h$, &c., to steady table E and keep it in a horizontal position. $t$ is the bearing for lever Q, and $s$ is a stop, which prevents lever Q from raising the table too high. F F, &c., is the main framework which supports the machine.

Having fully described my invention, what I claim as new, and desire to secure by Letters Patent, is—

1. So arranging the adjustable saw table E, and slotted dogs $e1$ and $e2$, in relation to the concentric saws $a$ and $b$, that the piece to be cut shall project beyond the table, and be supported by the dogs alone, after being separated, and fall when the dogs are retracted, substantially as set forth.

2. The arrangement of the adjustable table E, vertical guides $h$, supporting rods $l\ l$, and plate thereto attached, sliding upon the depending guide $h$ and lever Q, substantially as set forth.

NOBLE W. GRAVES.

Witnesses:
 CYRUS F. MILLER,
 JOHN M. BUELL.